United States Patent [19]

Lafler

[11] Patent Number: 4,824,486

[45] Date of Patent: Apr. 25, 1989

[54] SIMULATED WATERMARK PRINTING SYSTEM

[75] Inventor: Robert E. Lafler, Charlton City, Mass.

[73] Assignee: Westvaco Corporation, New York, N.Y.

[21] Appl. No.: 93,104

[22] Filed: Aug. 31, 1987

Related U.S. Application Data

[63] Continuation-in-part of Ser. No. 794,391, Nov. 4, 1985, abandoned.

[51] Int. Cl.$^4$ ............................................... C09D 11/08
[52] U.S. Cl. ........................................ 106/30; 106/20; 260/DIG. 38
[58] Field of Search ............................ 106/30, 20, 26; 260/DIG. 38; 523/161

[56] References Cited

U.S. PATENT DOCUMENTS 3,978,274  8/1976  Blum ................................. 428/476.3

*Primary Examiner*—Josephine Barr
*Attorney, Agent, or Firm*—W. A. Marcontell; R. L. Schmalz

[57] ABSTRACT

A wet laid watermark of uncoated paper is simulated by the use of a resin or resin-plasticizer mixture dissolved in a slow evaporating, high boiling solvent. A sufficient quantity of the low viscosity solution is printed onto an uncoated paper sheet of stationary grade by a standard flexographic press to penetrate the paper fiber and deposit a non-tacky solid having a refractive index which closely approximates that of cellulose. The resulting image of the print is visible to both faces of the paper sheet.

7 Claims, No Drawings

SIMULATED WATERMARK PRINTING SYSTEM

CROSS-REFERENCE TO RELATED APPLICATION

This application is a Continuation-In-Part of Applicant's U.S. application Ser. No. 06/794,391 filed Nov. 4, 1985 titled SIMULATED WATERMARK PRINTING SYSTEM and now abandoned.

BACKGROUND OF THE INVENTION

1. Field of the Invention:

The present invention relates to flexographic printing processes. More particularly, the invention relates to a process of printing uncoated paper of stationery grade with an image very similar to that of a wet-laid watermark.

2. Description of the Prior Art:

Watermarking is a process of faintly marking a sheet of paper with a permanent indicia. Such indicia is formed into the paper web during the papermaking process. No inks, colorants or resins are used. Localized orientation of the paper fiber in the indicia pattern provides an opacity difference within the body of the paper sheet.

Traditional watermarking dates back to a time when correspondence stationery was hand formed in single sheets from small batch vessels of aqueous pulp slurry. A forming screen stretched across a framed opening included the watermark pattern as woven into the screen matrix. Since each watermark was a distinctive original and the pulping and forming of paper sheet such a complex process, stationery sheets possessing the watermark carried an association of prestige and security. Counterfeiting a watermark was extremely difficult and rarely attempted.

In similar fashion, watermarks are formed in current, machine laid paper by the use of specialized equipment on the fourdrinier or forming table. In lieu of single sheets of watermarked paper, however, tons of watermarked paper web are produced for subsequent cutting and slitting. Simple economics, therefore, limit the availability of distinctive, individualized, watermarked paper to only the largest stationery users.

To avoid the adverse economics of a genuine, wet-laid, watermark on relatively small quantities of stationery and fine paper, the prior art developed a simulated watermark process whereby colorless solutions of solid resins are printed onto a paper web or sheet. Penetration of the paper by the resin solution alters the paper opacity to translucency. Although barely perceptable when forelighted, the simulated watermark pattern is sharp and distinct when illuminated by backlight.

Unfortunately, prior art resin printed "watermarks" tended to yellow or "age" in a relatively short period of time. Such age yellowing is generally considered unsightly and undesirable.

It is, therefore, an object of the present invention to provide a watermark printing system and formulation that does not yellow with age.

Another object of the present invention is to teach a system for economically printing stationery and other uncoated paper with indicia giving a watermark appearance from either face of a sheet.

Another object of the present invention is to teach a process and formulation for selectively reducing the opacity of uncoated grades of fine or stationery grade paper.

SUMMARY

These and other objects of the invention are achieved from a colorless or lightly tinted flexographic print solution formulated from an oxidation resistant resin such as Foral 85 (the ester of hydrogenated rosin) dissolved in a high boiling solvent such as Arcosov DPM (dipropylene glycol monomethyl ether). Electively, the solution may be further combined with a plasticizer such as a plasticizing resin to produce a fluid solution of approximately 50% solids and 20 to 40 second viscosity (No. 2 Zahn cup). This print solution is applied with a flexographic press having a 180 Pyramid anilox roll and a 75 to 85 durometer rubber fountain roll.

DESCRIPTION OF THE PREFERRED EMBODIMENT

Suitable printing equipment to which the present invention relates is a press of the flexographic type wherein an ink film is received from a fountain roll by an anilox roll for transfer to the raised plate surfaces of a plate cylinder. A traveling web substrate of uncoated, stationery grade paper is nipped between the raised surfaces of the rotating plate cylinder and the smoothly continuous, firmly resilient surface of an impression roll.

Essential characteristics of this press equipment combination include the anilox roll surface texture which is about 180 Pyramid. The fountain roll is rubber having a 75 to 85 durometer hardness.

In a first example of the invention, a colorless solution supplied to an anilox roll fountain was blended of 45% (weight) Foral 85, 5% (weight) Abitol 90X and 50% (weight) Dowanol PMA. The solution comprised 50% solids. Foral 85 is a thermoplastic stabilized ester resin product of Hercules Incorporated, Wilmington, Del. having a refractive index of about 1.50. The plasticizer of this formulation, Abitol 90X is a high molecular weight, primary, monohydric alcohol (hydroabietyl alcohol) derived from rosin acids that have been hydrogenated to reduce unsaturation. Abitol 90X has a refractive index of about 1.526 and is the proprietary product of Hercules Incorporated, Wilmington, Delaware. The solvent Dowanol PMA is a propylene glycol methyl ether acetate product of the Dow Chemical Co., Midland, Michigan, having a boiling point of 145.8° C. (294.5° F.).

A second example of the invention was formulated of 45% weight Foral 85, 5% weight Abitol 90X and 50% weight Arcosolv DPM. This example also represented about 50% solids. The solvent Arcosolv DPM has a boiling point of 188.3° C. (371° F.) and is the dipropylene glycol monomethyl ether product of the Atlantic Richfield Co., Philadelphia, Pennsylvania.

A third example included the same constituents as the second example but in slightly different proportions. In this case, the solution comprised 45% Foral 85, 6% Abitol 90X and 49% Arcosolv DPM. The solution provided a 50.4% solids constituency.

A fourth example of the invention included 50.625% Foral 85, 6.750% Abitol 90X and 42.625% Arcosolv DPM. This solution included 56.7% solids.

In a fifth example of the invention, 35% (weight) Foral 85 and 15% (weight) Abitol 90X was dissolved in 50% (weight) Arcosolv DPM.

For a sixth invention example, 35% (weight) Foral 85 and 15% (weight) Hercoflex 900 was dissolved in 50% (weight) Arcosolv DPM. Hercoflex 900 is a proprietary polyester plasticizer of Hercules, Incorporated, Wilmington, Delaware, having a refractive index of 1.530.

The seventh example of the invention comprised 40% (weight) Foral 85, 10% (weight) Santicizer 160 and 50% (weight) Arcosolv DPM. The solution comprised 50% solids. Santicizer 160 is a butyl benzyl phthalate compound having a refractive index of 1.535 that is supplied by Monsanto Chemical Co., Organic Chemicals Division, St. Louis, MO.

As an eighth example of the invention 45% (weight) Foral 85 and 5% (weight) Hercolyn D was dissolved in 50% (weight) Arcosolv DPM to provide a 50% solids solution. Hercolyn D is a hydrogenated methyl ester of rosin having a refractive index of 1.52. It is supplied by Hercules Incorporated, Wilmington, Delaware.

No measurements were taken of the refractive index respective to the solutions resulting from the foregoing formulations. However, no chemical reactions are known to result from blending the respective constituents. Consequently, the refractive index resulting from each formulated combination would be a function of the constituent indices and represent a range between 1.50 and 1.54. The refractive index of cellulose is in the range of 1.525 to 1.55.

These formulations were blended to a 20 to 40 second, No. 2 Zahn cup viscosity and applied to uncoated, white wove stationery paper with a flexographic press having the foregoing anilox and fountain roll specifications.

Having fully disclosed my invention,

I claim:

1. A printing solution for reducing the opacity index of paper to approximately that of cellulose comprising a solution of about 50% solids having a refractive index of between 1.50 and 1.54 and approximately 50% solvent having a boiling point in excess of 290° F., said solids portion of said solution comprising about 70% to 90% soluble, oxidation resistant resin that is the hydrogenated ester of rosin having a refractive index of about 1.50 and about 10% to 30% plasticizer.

2. A printing solution as described by claim 1 wherein said plasticizer is a polyester compound.

3. A printing solution as described by claim 1 wherein said plasticizer is a high molecular weight, hydroabietyl alcohol.

4. A printing solution as described by claim 1 wherein said plasticizer is butyl benzyl phthalate.

5. A printing solution as described by claim 1 wherein said plasticizer is a hydrogenated methyl ester of rosin having a refractive index of about 1.52.

6. A method of simulating watermarked paper comprising the step of printing a selected watermark indicia upon an uncoated paper sheet with a solution of approximately 50% solids and 50% solvent wherein said solids constituent of said solution has an opacity index approximating that of cellulose and comprises about 70% to 90% soluble, oxidation resistant resin and about 10% to 30% plasticizer and wherein said solvent constituent has a boiling point in excess of 290° F.

7. A method of simulating watermarked paper as described by claim 6 wherein said soluble resin is a stabilized ester resin.

* * * * *

UNITED STATES PATENT OFFICE
CERTIFICATE OF CORRECTION

PATENT NO. : 4,824,486
DATED : April 25, 1989
INVENTOR(S) : Robert E. Lafler

It is certified that error appears in the above-identified patent and that said Letters Patent is hereby corrected as shown below:

Delete the text of Claim 6 and insert the following:
--A printing solution as described by claim 1 wherein said solvent is propylene glycol methyl ether acetate.--

Delete the text of Claim 7 and insert the following:
--A printing solution as described by claim 1 wherein said solvent is dipropylene glycol monomethyl ether.--

Signed and Sealed this

Tenth Day of October, 1989

Attest:

DONALD J. QUIGG

Attesting Officer

Commissioner of Patents and Trademarks